United States Patent
Kun (12)

(10) Patent No.: US 6,254,325 B1
(45) Date of Patent: Jul. 3, 2001

(54) ANCHOR ASSEMBLY FOR A WALL, FLOOR OR LIKE SUPPORTING STRUCTURE

(76) Inventor: Steve Kun, P.O. Box 612545, North Miami, FL (US) 33261-2545

(\*) Notice: Subject to any disclaimer, the term of this patent is extended or adjusted under 35 U.S.C. 154(b) by 0 days.

(21) Appl. No.: 09/494,329

(22) Filed: Jan. 28, 2000

(51) Int. Cl.[7] .............................. F16B 13/04; F16B 13/06

(52) U.S. Cl. ................................. 411/38; 411/55; 411/69

(58) Field of Search ................................. 411/34, 37, 38, 411/55, 36, 69

(56) References Cited

U.S. PATENT DOCUMENTS

| | | |
|---|---|---|
| 2,324,142 | 7/1943 | Eklund . |
| 3,449,774 | * 6/1969 | Wilham .............................. 411/34 X |
| 3,880,041 | * 4/1975 | Markowski et al. .................... 411/34 |
| 4,662,808 | 5/1987 | Camilleri . |
| 4,760,843 | 8/1988 | Fischer et al. . |
| 4,871,289 | 10/1989 | Choiniere . |
| 5,051,636 | * 9/1991 | Ishimoto et al. ................... 411/34 X |
| 5,253,962 | * 10/1993 | Close, Jr. ............................ 411/34 |
| 5,655,864 | 8/1997 | Haage et al. . |

FOREIGN PATENT DOCUMENTS

942642 * 2/1949 (FR) ....................................... 411/34

\* cited by examiner

*Primary Examiner*—Neill Wilson
(74) *Attorney, Agent, or Firm*—Malloy & Malloy, P.A.

(57) ABSTRACT

An expandable anchor assembly removably secured to a wall, floor or other supporting structure for purposes of mounting any one of a variety of objects on the supporting structure, wherein the anchor assembly comprises an elongated sleeve including an interior, coaxially disposed channel extending along the length thereof between and in communication with open proximal and distal ends of the sleeve. A connecting structure is secured within the channel substantially adjacent to the distal end thereof and is cooperatively structured with an attachment portion of a connector, removably disposed within the channel through the open proximal end and into moveable engagement with the connecting structure. An at least partially elastic, intermediate wall portion is integrally formed on the sleeve between the proximal and distal ends and is selectively expandable radially outward from the channel as the distal end is forced towards the proximal end, thereby forcing the sleeve into a compressed position through moveable intermeshing engagement between the attachment portion and the connecting structure. The sleeve may be selectively disposed into an extended position through manipulation of the connector, thereby allowing a removal of the anchor assembly from the supporting structure.

11 Claims, 2 Drawing Sheets

ANCHOR ASSEMBLY FOR A WALL, FLOOR OR LIKE SUPPORTING STRUCTURE

BACKGROUND OF THE INVENTION

1. Field of the Invention

This invention relates to an anchor assembly structured to be removably secured to a wall, floor or like supporting structure and designed to mount any one of a variety of objects thereon. The anchor assembly comprises a flexible material sleeve including an interior channel into which a connector is disposed, wherein the sleeve is inserted into a pre-formed opening in the supporting structure and is selectively oriented into and out of a compressed, radially expanded position, by rotation or other manipulation of the inserted connector. In the expanded position, the sleeve and the connector may be prevented, in one embodiment, from passing back through the pre-formed opening in the supporting structure until the connector is detached from the sleeve, thereby serving to orient the sleeve in a normal, non-expanded position.

2. Description of the Related Art

In the mounting or support of any of a large variety of objects on a wall or similar supporting structure, it is common practice to use anchors, fasteners, plugs, etc. Some of these are structured to be secured on or within the wall, and thereafter, to be expanded in order to prevent or significantly reduce the possibility of the anchor or fastener becoming inadvertently dislodged. Typically, anchors or fasteners of this type are made from a metallic or rigid plastic material and generally include an internal bore or throat which runs axially parallel to the length of the body of the fastener. In addition, the bore or throat usually has a tapering internal configuration intended to be engaged by an inwardly projecting nail, screw, etc. When the nail or screw is inserted into the bore or throat, it is dimensioned and/or configured to normally engage one or more separable fingers or segments formed on the body of the anchor or fastener and to cause them to pivot or otherwise be disposed laterally outward from the remainder of the body. When forced outwardly, the laterally projecting segments are disposed beyond the transverse dimension of an opening, formed in the wall or like supporting structure to initially receive the body of the fastener, thereby preventing or at least significantly restricting the removal of the fastener.

Expandable fasteners or anchors of the type referred to above are used for certain limited applications, and therefore, are considered to be at least generally operable for their intended functions. However, these types of fasteners are recognized as having certain problems and disadvantages which restrict their use for a variety of applications. Such disadvantages include a general inability of the fastener to be easily removed for purposes of re-use and any attempts to remove the fastener from the pre-formed opening or aperture formed in the wall, usually results in the portion of the wall surface being permanently marred. Also, whether the fastener is removed or left in place, the corresponding wall surface remains in a somewhat damaged condition. In addition, the portion of the wall surface being engaged by such a conventional expansion-type fastener may not be easily repaired or covered, even if spackle, putty or other materials typically used to repair a wall surface are applied.

Another disadvantage associated with the known expandable anchors or fasteners is their inability to reliably support heavier objects, especially on a vertically oriented wall surface. In addition, the structure and design of these conventionally known fasteners make them less versatile in that they are generally usable only for their rather limited, intended applications, rather than being structured for installation in a plurality of different supporting structures, such as a wall, floor, ceiling, roof, etc. and regardless of whether the supporting structure is made of dry wall, wood or concrete. Also, conventional or known expansion fasteners are generally formed from a rigid plastic material or metallic material which lacks any observable elastic characteristics or capabilities. Therefore, the body of such known fasteners or anchors cannot be repeatedly oriented between an initial configuration, during the insertion of a fastener, and an somewhat expanded or enlarged configuration, nor subsequent to its insertion, and as such, the known devices do not allow for the continued reuse of the fastener in a variety of applications.

In addition to the above, known, expandable fasteners typically include the aforementioned central, axially disposed throat or bore incorporating longitudinal slits or elongated grooves, which allow for the aforementioned segments to expand outwardly along substantially a majority of the length of the body of the fastener. However, such a structural design results in a "cleaving" effect which does not allow stress, placed on the fastener or anchor, to be distributed uniformly throughout the area adjacent the opening or aperture through which the body of the fastener is initially inserted. Because of this type of design flaw, the holding forces provided by such known or conventional fastener structures is less than typically required for the mounting or support of a variety of heavier objects. Therefore, it is extremely difficult if not impossible to safely or effectively mount this type of conventional fastener in floors or ceilings, for purposes of anchoring heavier objects or anchoring load bearing components associated with the building itself.

Accordingly, there remains a need in this art for an anchoring assembly designed and structured to have sufficient versatility for use in a variety of different applications and which is particularly capable of being secured to a variety of different supporting structures such as, but not limited to, walls, floors, ceilings, etc. If any such improved anchoring assembly were developed, it should be capable of being used with not only a variety of supporting structures, but of supporting structures made of a variety of materials, including but not limited to dry wall, wood, and concrete. In addition, if any such improved anchor assembly were developed it should also be capable of mounting or attaching any one of a variety of objects of varying weights and/or sizes to the different supporting structures. In addition to the above, the structural features of any such improved anchor assembly should be such as to allow its removable, but secure and stable attachment to the wall, floor or like supporting structure, thereby allowing for repeated uses of the anchor assembly. In order to accomplish such continuous reuse, as well as better facilitate the insertion and/or removal of the anchor assembly from its supporting structure, the improved anchor assembly should ideally be selectively and easily disposed between a transversely expanded position or a substantially normal, non-expanded or linear position.

SUMMARY OF THE INVENTION

This invention is directed to an anchor assembly structured to be removably secured to a wall, floor or other applicable supporting structure and designed to support, mount or attach any one of a plurality of objects to the wall, floor or like supporting structure in a stable and secure manner. More specifically, the anchor assembly of the present invention comprises an elongated sleeve at least partially formed from an elastic, compressible material. The sleeve terminates in oppositely disposed proximal and distal ends and in at least one embodiment, both the proximal and distal ends are open. The sleeve further includes an internally disposed channel extending along at least a majority of the length thereof in direct communication with at least the open proximal end. For reasons to be explained in greater detail hereinafter, at least one embodiment of the present invention comprises the internally disposed channel being oriented in substantially coaxial relation to the sleeve and extending along substantially the entire length thereof, so as to communicate with both the open proximal end and the oppositely disposed open distal end.

Other structural features of the present invention include the sleeve having a wall portion extending along at least a portion of its length between the proximal and distal ends thereof. This wall portion is formed from an elastic or otherwise compressible material and is specifically structured to allow its selective orientation between an extended position and a compressed position. In what may be considered its normal, outwardly extended position, the sleeve assumes a substantially linear orientation. The compressed position is accomplished by the forced movement of the distal end of the sleeve axially towards the proximal end. This forced positioning of the proximal end will result in the shortening of the longitudinal dimension of the sleeve, while at the same time causing the specifically structured, intermediate wall portion to be compressed upon itself and thereby expand in a substantially radially outward direction relative to the central channel of the sleeve. In order to facilitate the radially outward expansion of the intermediate wall portion, it may be structurally configured to include an at least partially corrugated or "ribbed" construction. This corrugated or ribbed construction can be more specifically defined by a plurality of annular ridges or ribs, surrounding the sleeve and separated from one another by plurality of spaced apart, alternately positioned grooves, which also may include a substantially annular configuration. Therefore, as the distal end of the sleeve is forced axially towards the proximal end thereof, the aforementioned corrugated or ribbed construction facilitates the longitudinal compression of the wall portion, upon itself. Due to the elastic material from which this intermediate wall portion is formed, such compression thereof will result in a lateral, radially outward expansion, which will serve to enlarge the overall transverse dimension of the sleeve in the area of the compressed intermediate wall portion. Therefore, and as will be explained in greater detail hereinafter, the sleeve, when oriented in the aforementioned compressed position, will be prevented from being removed from the wall, floor, ceiling or like supporting structure in which it has been initially inserted.

In order to accomplish secure attachment or connection of the sleeve to the wall or like supporting structure, the anchor assembly of the present invention also includes an elongated connector generally in the form of a bolt, screw or similar type of structure having an elongated shaft and somewhat of an enlarged head. The head of the connector is integrally or otherwise fixedly secured to one end thereof and has a transverse dimension greater than the transverse dimension of the centrally disposed channel within the sleeve and also greater than the transverse dimension of the opening of the proximal end of the sleeve. Mounting of the anchor assembly is accomplished by first forming an opening or aperture in the wall, floor or like supporting structure. This preformed opening should have a transverse dimension substantially corresponding to a transverse dimension of a portion of the sleeve adjacent to the proximal end thereof, so as to provide a substantially close fit therebetween. Naturally, the transverse dimension of the sleeve, as well as the preformed opening through which it passes may vary, in that larger anchor assemblies, which will include the same basic structural components as set forth herein, will be utilized to support heavier objects. Once the sleeve is inserted through the opening, the connector initially passes through the open proximal end and along the length of the channel until it reaches a connecting structure mounted on or integrally formed in the interior surface of the channel, substantially adjacent the distal end of the sleeve. The interior surface of this connecting structure is cooperatively structured or otherwise configured to correspond with an attachment portion formed along at least a portion of the length of the shaft of the connector. Therefore, the exterior surface of the attachment portion and the interior surface of the connecting structure are such as to intermeshingly engage or otherwise mate, so as to define a moveable, interconnecting attachment therebetween. By way of example only, corresponding mating surfaces of the connecting structure, within the channel and the attachment portion, on the exterior of the connector may be structured to define an intermeshing, threaded engagement therebetween. Accordingly, upon rotation of the connector, relative to the sleeve, the intermeshing engagement between the attachment portion and the connecting structure forces the portion of the sleeve substantially adjacent to the distal end, to travel along the length of the connector towards the proximal end of the sleeve.

This will force the intermediate wall portion of the sleeve into the aforementioned compressed position.

As set forth above, at least the intermediate wall portion of the sleeve is formed from an elastic or at least compressible material. Accordingly, the intermediate wall portion should be capable of demonstrating sufficient elastic characteristics to assume its normal, outwardly extended substantially linear orientation upon a rotation of the connector in the opposite direction. Such rotation will force the connecting structure and the distal end portion of the sleeve attached thereto, to travel along the length of the sleeve, until the sleeve assumes the extended position. Once the connector is at least partially, if not completely detached from the connecting structure within the channel of the sleeve, it may be removed along with the sleeve, thereby enabling reuse of the anchor assembly of the present invention as desired.

While the entire sleeve may be formed from an at least partially elastic or at least flexible material, the intermediate wall portion is preferably formed from a material having sufficient elastic characteristics or qualities to allow its radially outward expansion, beyond the transverse dimension or diameter of the pre-formed opening in the supporting structure through which the sleeve is initially inserted. While in the radially outward, expanded orientation, the sleeve, as set forth above, will not be able to be removed from the supporting structure and will develop a significant holding or gripping force on the supporting structure. Further, the resulting gripping force will be sufficient to enable the attachment, mounting or support of a variety of objects, regardless of their weight, in an intended fashion.

Therefore, the sleeve, including the intermediate wall portion may have an integral, one piece construction, wherein the corrugated or ribbed construction of the intermediate wall portion increases the elastic characteristics thereof. Naturally, a variety of materials which demonstrate such sufficient elastic capabilities may be utilized and include natural or synthetic rubber, a variety of elastic plastics or other applicable material.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying drawings, the present invention is directed towards an anchor assembly, generally indicated as 10, which is structured to be removably secured to a wall, floor, or other type of supporting structure and which is readily usable with such supporting structures despite variations in the material from which they are made, such as wood, dry wall, concrete, metal or plastic, etc. The anchor assembly 10 is preferably designed to support, mount or attach any one of a plurality of objects to the wall, floor or other supporting structure in a stable and secure manner.

Figure 1:
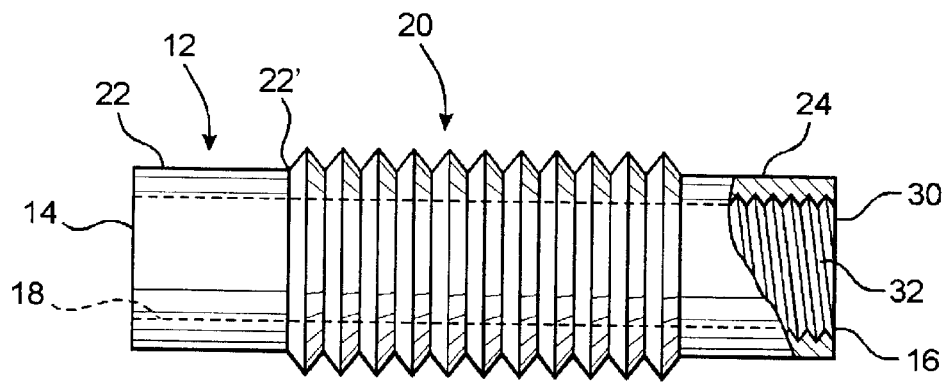
FIG. 1 is a side view in partial section and cutaway of a sleeve portion of the anchor assembly of the present invention.
Figure 2:
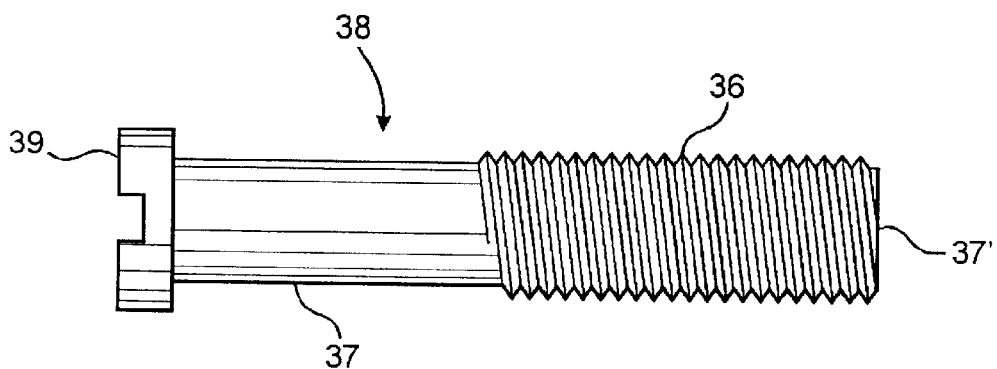
FIG. 2 is a side view of a connector designed to be a removably connected to the sleeve of the embodiment of FIG. 1 by insertion therein.

With reference to FIG. 1, the anchor assembly 10 of the present invention includes an elongated sleeve, generally indicated as 12, having an open proximal end 14 and preferably an open, oppositely disposed distal end 16. In addition, the sleeve 12 includes an internally disposed channel 18 preferably communicating with both the open proximal and distal ends 14 and 16, respectfully. Also, the internal channel 18 has a longitudinal dimension sufficient to extend substantially along the entire length of the sleeve 12 and is preferably coaxially disposed therewith. Other structural features of the sleeve 12 include an intermediate wall portion 20 which is disposed between the proximal end 14 and distal end 16 and, as shown in the embodiment of FIGS. 1, 3, and 4, the intermediate wall portion 20 may be spaced inwardly from the proximal end 14 and the oppositely disposed distal end 16.

In the preferred embodiment, the intermediate wall portion 20 is further characterized by a substantially corrugated or generally "ribbed" construction extending along its length. The corrugated or ribbed construction is specifically dimensioned and structured to facilitate the selective orientation of the sleeve 10 between a normal, outwardly extended and somewhat linear orientation, as shown in FIGS. 1 and 3 and a compressed orientation, as shown in FIG. 4. In order to assume the compressed position of FIG. 4, at least the intermediate wall portion 20 is formed from an elastic, compressible material, which extends radially outward when the sleeve 12 is disposed in the aforementioned compressed position.

Figure 3:
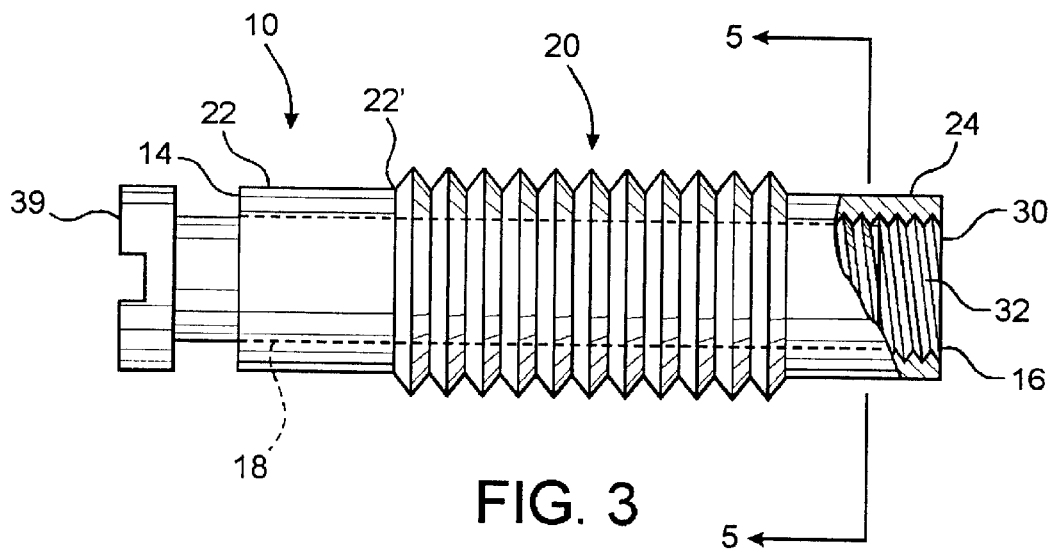
FIG. 3 is a side view in partial section and cutaway of an at least partially assembled embodiment of the combined sleeve and connector structures of the embodiment of FIGS. 1 and 2.
Figure 4:
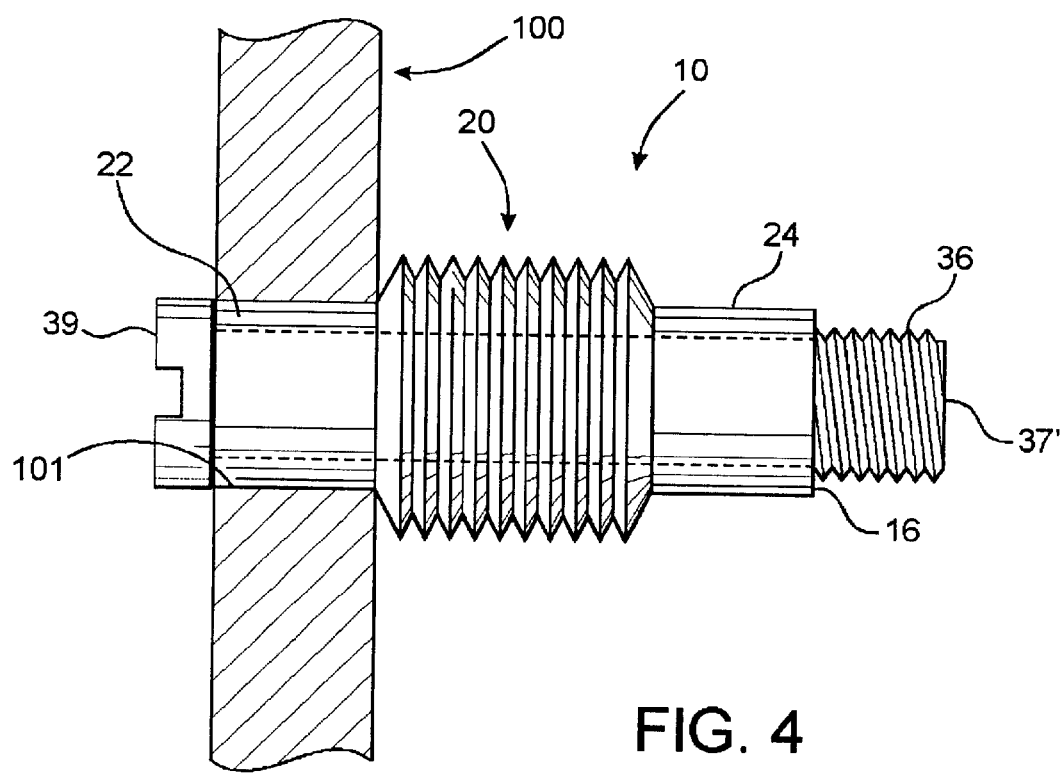
FIG. 4 is a side view in partial section showing the assembled sleeve and connector structure of the anchor assembly of the present invention, wherein the sleeve is disposed in a compressed position.
Figure 5:
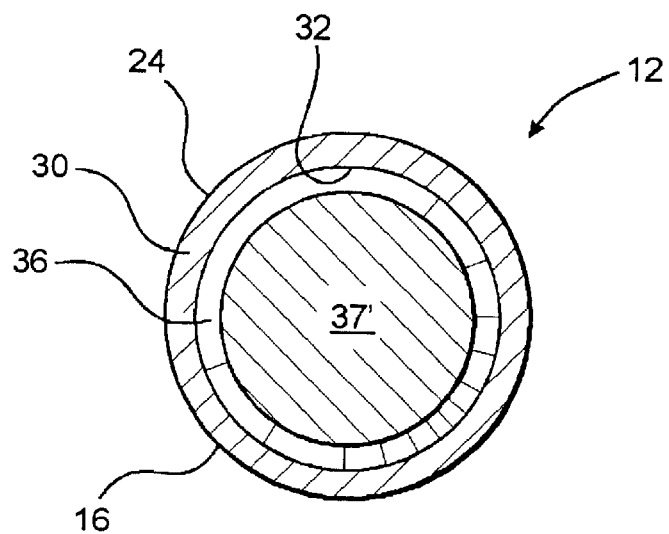
FIG. 5 is a transverse sectional view along line 5—5 of FIG. 3.

Other features of the sleeve 12 preferably include a leading wall segment 22 and a trailing wall segment 24 which respectively extend in somewhat separating relation between the intermediate wall portion 20 and the proximal and distal ends 14 and 16, as shown in FIGS. 1, 3 and 4. It is emphasized that while the intermediate wall portion 20 is shown as extending along a majority of the length of the sleeve and specifically between leading and trailing wall segments 22 and 24, additional embodiments of the sleeve 12 could incorporate the intermediate wall portion 20 being dimensioned to include different lengths. More specifically, the substantially corrugated or ribbed construction thereof could extend along almost the entire length of the sleeve 12 or alternatively at least from the corresponding end of the leading wall segment 22, as at 22' towards and into a substantially contiguous relation to the open distal end 16.

In order to accomplish secure attachment or connection of the sleeve 12 to a wall, floor, or like supporting structure as indicated by reference numeral 100 in FIG. 4, the anchor assembly 10 of the present invention also includes an elongated connector 38, such as but not limited to a bolt, screw or similar type of structure having an elongated shaft 37 and somewhat of an enlarged head 39. The head 39 of the connector 38 is preferably, but not necessarily, integrally or otherwise fixedly secured to one end thereof and further, has a transverse dimension greater than the transverse dimension of the centrally disposed channel 18 within the sleeve 12, and also greater than the transverse dimension of the opening of the proximal end 14 of the sleeve 12.

Still additional structural features of the sleeve 12 include the provision of a connecting structure 30 fixedly secured or integrally formed on the interior of the sleeve 12, and preferably, adjacent to the distal open end 16 as shown. The connecting structure may take the form of a high strength, lightweight, substantially rigid material connector, which may generally be in the form of a nut-like connecting component. Most preferably, the connecting structure is secured on the interior of the channel 18 and is specifically connected to the trailing wall segment 24. Accordingly, the connecting structure 30 and the trailing wall segment 24 are forced to move with one another, as the sleeve 12 is oriented between the extended position of FIGS. 1 and 3 and the compressed position of FIG. 4. An alternative embodiment of the connecting structure 30 would comprise the interior surface 32 being integrally formed within the channel 18 in the position shown. In such an embodiment, the interior surface 32 would be defined by a threaded configuration. The connecting structure 30 would, therefore, movably and securely engage an attachment portion 36 integrally formed on the exterior surface of the shaft 37 of an elongated connector 38. The attachment portion 36 and in particular, the threaded exterior surface thereof, would be disposed adjacent to the distal end 37' of shaft 37 and extend along at least a portion of the length of the shaft 37, toward the head 39. As noted above, the head 39 is preferably structured to include a greater transverse dimension than that of the shaft 37 and also should be larger than the open proximal end 14 of the sleeve, as is clearly shown in FIGS. 3 and 4.

In operation, the anchor assembly 10 is mounted on a wall, floor, roof, or any other applicable supporting structure, generally indicated as 100 in FIG. 4. An opening or aperture as at 101 is formed in an appropriate location within the supporting structure 100 and is dimensioned to substantially correspond to the transverse dimension of at least the leading wall segment 22 as shown. It should be noted that one advantage associated with the anchoring assembly of the present invention is that the outer dimension of the sleeve, while it should be somewhat smaller than that of the preformed hole in the supporting structure 100, does not have to closely correspond thereto because of the adjustability of the sleeve to that dimension in the compressed position. It should be further noted that depending upon the thickness of the support structure 100, the longitudinal dimension of the leading wall segment 22, or that distance between the proximal end 14 and the end 22' of the leading wall segment 22 could vary so as to accommodate and substantially correspond to the thickness of the supporting structure 100. Once the opening 101 is formed, the sleeve 100, being in its normal, outwardly extended position as shown in FIGS. 1 and 3 is inserted through the opening 101. Once inserted, the connector 38 extends through the open proximal end 14 of the sleeve 12 until the attachment portion 36, including its exterior threaded surface configuration reaches the interior surface 32 of the connecting structure 30. Once these two portions engage, rotation of the connector 38 causes a movable but secure, intermeshing and mating engagement between the attachment portion 36 and the connecting structure 30. The head 39 will therefore eventually rest against the proximal end 14, thereby effectively limiting and at some point preventing further travel of the connector into the interior of the channel 18. Continued rotation of the connector 38, through manipulation of the enlarge head 39 will force the connecting structure 30 to travel along the length of the shaft 37 and along the corresponding length of the attachment portion 36. Due to the fixed interconnection of the connecting structure 30 with the trailing wall segment 24, the trailing wall segment 24 and the distal end 16 will be forced to travel towards the proximal end 14 and the leading wall segment 22. This will, of course, shorten the longitudinal dimension of the sleeve 12 as it moves from the extended, substantially linear orientation of FIG. 3 into the compressed position shown in FIG. 4.

The aforementioned elastic material from which the intermediate wall portion 20 is formed as well as the substantially corrugated and/or ribbed construction of the intermediate wall portion 20 will cause it to be compressed upon itself as shown in FIG. 4, which in turn, will result in a radially outward expansion of the intermediate wall portion 20. The elastic characteristics from which the intermediate wall portion 20 is formed will allow the laterally outward expansion thereof to a point where its transverse dimension is greater than the transverse dimension of the opening or aperture 101 formed in the supporting structure 100. Removal of the sleeve will be prevented unless and until the connector 38 is removed from the interior channel 18 by detachment of the attachment portion 36 from the mating interior surface 32 of the connecting structure 30. Once so detached, the sleeve, due again to the resilient, elastic nature of the material from which the intermediate wall portion 20 is formed, will assume its elongated, outwardly extending and substantially linear orientation. The sleeve 12 as well as the connector 38 can then be removed from the supporting structure 100 by passing back through the opening 101. Repeated use of the anchor assembly 10, in the manner described above, is thereby facilitated.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An anchor assembly structured to be secured to a wall, floor or other supporting structure, said anchor assembly comprising:
  a) an elongated sleeve at least partially formed of a compressible material and terminating at an open proximal end and an oppositely disposed distal end,
  b) said sleeve including an elongated interior channel disposed in communicating relation with said proximal end and extending towards said distal end,
  c) a connecting structure at least partially disposed within said channel in predetermined spaced relation to said proximal end,
  d) a connector disposed within said channel through said open proximal end and into moveable engagement with said connecting structure,
  e) said sleeve capable of being disposed in either a compressed position or an extended position dependent on the spaced distance between said connecting structure and said proximal end,
  f) said sleeve further comprising an intermediate wall portion disposed between and in spaced relation to said proximal end and said distal end and including a collapsible structure expandable radially outward from said channel when said sleeve is in said compressed position, and
  g) said collapsible structure being at least partially defined by a ribbed construction extending along a majority of a length thereof, said ribbed construction having a thickness of lessor dimension than a remainder of said sleeve.

2. An assembly as recited in claim 1 wherein said sleeve is at least partially formed of an elastic material and is removably disposable in either said compressed or extended positions.

3. An assembly as recited in claim 2 wherein said sleeve comprises a wall portion at least partially formed from said elastic material, said compressed position defined by said wall portion disposed in a radially outward, expanded orientation when said sleeve is in said compressed position.

4. An assembly as recited in claim 1 wherein said sleeve comprises a wall portion disposed between said proximal and distal ends, said wall portion removably disposed in a radially outward expanded orientation when said sleeve is in said compressed position.

5. An assembly as recited in claim 1 wherein said sleeve comprises a trailing wall segment extending between said distal end and said intermediate wall portion, said trailing wall segment disposed radially inward of said intermediate wall portion when said sleeve is in said compressed position.

6. An assembly as recited in claim 5 wherein said compressed position is further defined by said trailing wall segment disposed in closer spaced relation to said leading wall segment than when said sleeve is disposed in said extended position and said intermediate wall portion disposed radially outward from both said leading and trailing wall segments.

7. An assembly as recited in claim 6 wherein said connecting structure is mounted on said trailing wall segment and movable therewith relative to said leading wall segment, said connector including an attachment portion mounted thereon and disposed in movable engagement with said connecting structure.

8. An assembly as recited in claim 7 wherein said attachment portion and connecting structure are cooperatively structured to force movement of said connector portion and said trailing wall segment along a length of said connector into and out of either said compressed position or said extended position.

9. An assembly as recited in claim 8 wherein said cooperative structure of said attachment portion and said connecting structure comprises an intermeshing threaded engagement therebetween.

10. An anchor assembly structured to be secured to a wall, floor or other supporting structure, said anchor assembly comprising:
   a) an elongated sleeve at least partially formed of a compressible material and terminating at an open proximal end and an oppositely disposed distal end,
   b) said sleeve including an elongated interior channel disposed in communicating relation with said proximal end and extending towards said distal end,
   c) a connecting structure at least partially disposed within said channel in predetermined spaced relation to said proximal end,
   d) a connector disposed within said channel through said open proximal end and into moveable engagement with said connecting structure,
   e) said sleeve being capable of being is disposed in either a compressed position or an extended position dependent on the spaced distance between said connecting structure and said proximal end,
   f) said sleeve further comprising an intermediate wall portion at least partially formed of an elastic material and removably disposed radially outward from said channel when said sleeve is in said compressed position,
   g) said sleeve further comprising a trailing wall segment disposed between said distal end and said intermediate wall portion, said trailing wall segment disposed radially inward of said intermediate wall portion when said sleeve is in said compressed position,
   h) said connecting structure being further connected to said trailing wall segment and moveable therewith relative to a leading wall segment extending generally between said proximal end and said intermediate wall portion, said connector including an attachment portion mounted thereon and disposed in moveable engagement with said connecting structure, said attachment portion and said connecting structure being cooperatively structured to force movement of said connector towards and away from said proximal end and into and out of either said compressed position or said extended position, and
   i) said intermediate wall portion comprises a substantially corrugated structure including a plurality of spaced apart ribs extending along the length thereof.

11. An anchor assembly structured to be secured to a wall, floor or other supporting structure, said anchor assembly comprising:
   a) an elongated sleeve at least partially formed of a compressible material and terminating at an open proximal end and an oppositely disposed distal end,
   b) said sleeve including an elongated interior channel disposed in communicating relation with said proximal end and extending towards said distal end,
   c) a connecting structure at least partially disposed within said channel in predetermined spaced relation to said proximal end,
   d) a connector disposed within said channel through said open proximal end and into moveable engagement with said connecting structure,
   e) said sleeve capable of being is disposed in either a compressed position or an extended position dependent on the spaced distance between said connecting structure and said proximal end,
   f) said sleeve including a collapsible structure expandable radially outward from said channel when said sleeve is in said compressed position, and
   g) said collapsible structure being at least partially defined by a ribbed construction extending along a majority of a length thereof, said ribbed construction having a thickness of lessor dimension than a remainder of said sleeve.

\* \* \* \* \*